(12) United States Patent
Lepage

(10) Patent No.: US 12,436,131 B2
(45) Date of Patent: Oct. 7, 2025

(54) HIGH TEMPERATURE ECA PROBE

(71) Applicant: Evident Canada, Inc., Québec (CA)

(72) Inventor: Benoit Lepage, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 144 days.

(21) Appl. No.: 18/555,965

(22) PCT Filed: Apr. 19, 2022

(86) PCT No.: PCT/CA2022/050591
§ 371 (c)(1),
(2) Date: Oct. 18, 2023

(87) PCT Pub. No.: WO2022/221938
PCT Pub. Date: Oct. 27, 2022

(65) Prior Publication Data
US 2024/0085376 A1    Mar. 14, 2024

Related U.S. Application Data

(60) Provisional application No. 63/201,297, filed on Apr. 22, 2021.

(51) Int. Cl.
*G01N 27/90* (2021.01)
*G01N 27/9093* (2021.01)

(52) U.S. Cl.
CPC ..... *G01N 27/9006* (2013.01); *G01N 27/9046* (2013.01); *G01N 27/9093* (2013.01)

(58) Field of Classification Search
CPC ........... G01N 27/9006; G01N 27/9046; G01N 27/9093

USPC .......................................................... 324/240
See application file for complete search history.

(56) References Cited

U.S. PATENT DOCUMENTS

2007/0285088 A1* 12/2007 Meilland ............ G01N 27/9006
                                                    324/228
2014/0002072 A1    1/2014 Lepage

FOREIGN PATENT DOCUMENTS

| CN | 105717192 | 6/2016 | |
|----|-----------|--------|---|
| CN | 111879848 | 11/2020 | |
| EP | 0067935 A2 * | 12/1982 | ......... G01N 27/9013 |
| EP | 0524342 A1 * | 1/1993 | ........... G01N 27/904 |

(Continued)

OTHER PUBLICATIONS

Luz; Translation of EP 0067935 B1; Dec. 29, 1982; Translated by Google & EPO (Year: 1982).*

(Continued)

*Primary Examiner* — Alesa Allgood
*Assistant Examiner* — Rahul Maini
(74) *Attorney, Agent, or Firm* — Schwegman Lundberg & Woessner, P.A.

(57) ABSTRACT

An eddy current probe assembly for analyzing an article is provided. The eddy current probe assembly includes a housing, an eddy current probe disposed on or within the housing, and a barrier layer. The housing has a coolant passage that extends into the housing and forms a loop within the housing. The coolant passage allows for coolant flow through the housing. The eddy current probe thermally couples with a first portion of the coolant passage at a first surface of the eddy current probe. The barrier layer is on a second surface of the eddy current probe opposite the first surface of the eddy current probe.

20 Claims, 10 Drawing Sheets

(56) References Cited

FOREIGN PATENT DOCUMENTS

| | | | |
|---|---|---|---|
| JP | S56143423 | 11/1981 | |
| JP | S5847760 | 3/1983 | |
| JP | S5926054 | 2/1984 | |
| JP | 2002062280 | 2/2002 | |
| JP | 2006339271 A * | 12/2006 | ............... H05K 7/20 |
| JP | 2007513330 | 5/2007 | |
| WO | WO-2022221938 A1 | 10/2022 | |

OTHER PUBLICATIONS

Masaru; Translation of JP 2006339271 A; Dec. 14, 2006; Translated by Google & EPO (Year: 2006).*

"International Application Serial No. PCT/CA2022/050591, International Search Report mailed Jul. 11, 2022", 3 pgs.

"International Application Serial No. PCT/CA2022/050591, Written Opinion mailed Jul. 11, 2022", 6 pgs.

"Canadian Application Serial No. 3,217,014, Examiners Rule 86(2) Report mailed Dec. 18, 2024", 4 pgs.

"European Application Serial No. 22790624.5, Response filed May 2, 2024 to Communication pursuant to Rules 161(2) and 162 EPC mailed Nov. 30, 2023", 3 pgs.

"Japanese Application Serial No. 2023-564581, Notification of Reasons for Refusal mailed Sep. 2, 2024", w English translation, 5 pgs.

"Japanese Application Serial No. 2023-564581, Response filed Nov. 18, 2024 to Notification of Reasons for Refusal mailed Sep. 2, 2024", w current English claims, 10 pgs.

"European Application Serial No. 22790624.5, Extended European Search Report mailed Dec. 2, 2024", 9 pgs.

"Canadian Application Serial No. 3,217,014, Response filed Apr. 2, 2025 to Examiners Rule 86(2) Report mailed Dec. 18, 2024", 24 pgs.

"European Application Serial No. 22790624.5, Response filed Jun. 17, 2025 to Extended European Search Report mailed Dec. 2, 2024", w/ claims, 6 pgs.

* cited by examiner

HIGH TEMPERATURE ECA PROBE

CROSS-REFERENCE TO RELATED APPLICATION

This application is a U.S. National Stage filing under 37 U.S.C. § 371 of International Patent Application No. PCT/CA2022/050591, filed Apr. 19, 2022, which claims priority to U.S. Provisional Patent Application Ser. No. 63/201,297, filed Apr. 22, 2021, the contents of which are incorporated herein by reference in their entireties.

TECHNICAL FIELD

This document pertains generally, but not by way of limitation, to a system for use with a non-destructive testing (NDT) inspection device that can be used to analyze a component. More specifically, but not by way of limitation, the present application relates to a cooling system for an eddy current probe that can be used in support of analysis of a component.

BACKGROUND

Eddy current testing (ECT) is a form of non-destructive testing. ECT can be used to detect cracks, flaws, or corrosion on or within a conductive material. As an illustration, structures can be analyzed using ECT to detect features, such as flaws, that are open to or near a surface. Such structures can include articles that are used for aerospace applications, such as conductive structures forming parts of fuselage or wing regions, or related support structures such as bars or spars. In another example, articles related to petrochemical extraction, transport, or processing, such as conductive piping and other tubing, can be inspected using ECT. ECT may also be used to monitor the effects of heat treatment on articles or for determining a thickness of a nonconductive coating over conductive coatings, for example.

Typically, ECT uses an eddy current probe that generates an oscillating magnetic field created by alternating current flow through one or more conductive coils. When the eddy current probe is energized and brought close to a conductive material, an eddy current is induced in the conductive material. Inhomogeneities in the conductive material, such as flaws or thickness variation, can alter the amplitude and pattern of the induced eddy current along with the resulting magnetic field. The altered amplitude or spatial pattern of the eddy current distribution can be detected by sensing an impedance in a receiver coil of the eddy current probe. Detected impedance data can be logged or plotted, such as then used by an operator to identify changes and/or defects in the component being inspected.

In situations where an article includes a ferromagnetic material, such as steel, the ferromagnetism associated with the material increases the difficulty of sensing defects of the article using ECT. In order to address the problem of ferromagnetism affecting the ability of an eddy current probe to detect defects during ECT, ferromagnetic articles are analyzed at a temperature above a Curie point of the article. At the Curie point, a sharp change in the ferromagnetic properties occurs such that ferromagnetism of the article has a lesser impact on ECT (e.g., testing above a Curie point suppresses ferromagnetic behavior in the article under test, and facilitates testing using ECT). For example, the Curie point for steel can be in excess of 700° C. Therefore, ECT can be performed when the article is above 700° C. However, when an article is analyzed at a temperature above the Curie point, eddy current probes that are used in the ECT are exposed to extreme heat levels and extreme heat cycling, which can degrade the eddy current probes and lead to premature failure of the eddy current probes used during ECT.

SUMMARY

To address the challenges above, the present inventor has recognized that an eddy current probe can include a configuration to cool an eddy current array (ECA) of an eddy current probe during ECT. Optionally, the eddy current probe assembly can provide cooling for electronics that control an ECA during ECT while suppressing wear or damage to the ECA during ECT of an article.

Examples of the present disclosure solve the challenges noted above by providing an eddy current probe assembly that includes a housing and a coolant passage that extends into the housing. During operation of the cooling apparatus, a coolant, such as water, oil, or a coolant that includes ethylene glycol or propylene glycol, is provided to the eddy current probe assembly. The eddy current probe assembly can also include an eddy current probe that can be used to analyze an article that is at an elevated temperature. In an embodiment, the eddy current probe can be thermally coupled with the coolant passage such that heat absorbed by the eddy current probe during analysis of the article at an elevated temperature conducts to the coolant passage and the coolant within the coolant passage. In addition, the cooling apparatus can include a barrier layer disposed adjacent the eddy current probe, where the barrier layer serves as a thermal barrier or a protection barrier between the eddy current probe and the article being analyzed during ECT.

In a further example, the cooling apparatus can include electronics that control an ECA within the eddy current probe. The electronics can be disposed on a side of the housing opposite to the eddy current probe. Moreover, the electronics can be thermally coupled to the coolant passage such that heat absorbed by the electronics via radiation conducts to the coolant passage and the coolant within the coolant passage.

DETAILED DESCRIPTION

Examples of the present disclosure provide an eddy current probe assembly that includes a housing and a coolant passage that extends into the housing. During operation of the cooling apparatus, a coolant, such as water, oil, or a coolant that includes ethylene glycol or propylene glycol, is provided to the eddy current probe assembly. The eddy current probe assembly can also include an eddy current probe that can be used to analyze an article that is at an elevated temperature. In an embodiment, the eddy current probe can be thermally coupled with the coolant passage such that heat absorbed by the eddy current probe during analysis of the article at an elevated temperature conducts to the coolant passage and the coolant within the coolant passage. In addition, the cooling apparatus can include a barrier layer disposed adjacent the eddy current probe, where the barrier layer serves as a thermal barrier or a protection barrier between the eddy current probe and the article being analyzed during ECT.

In a further embodiment, the coolant passage can be in direct contact with the eddy current probe of the eddy current probe assembly. In this embodiment, the eddy current probe can have thickness in a range of about 0.07 mm to about 0.5 mm. In the embodiment where the coolant passage is in direct contact with the eddy probe having a thickness in a range of about 0.07 mm to about 0.5 mm, a temperature gradient can be formed between an outer surface of the barrier and the coolant passage where an outer surface of the barrier can have a temperature of about 700° C. while the eddy current probe has a temperature of about 100° C. since the eddy current probe can be in direct contact with the coolant passage.

Figure 1:
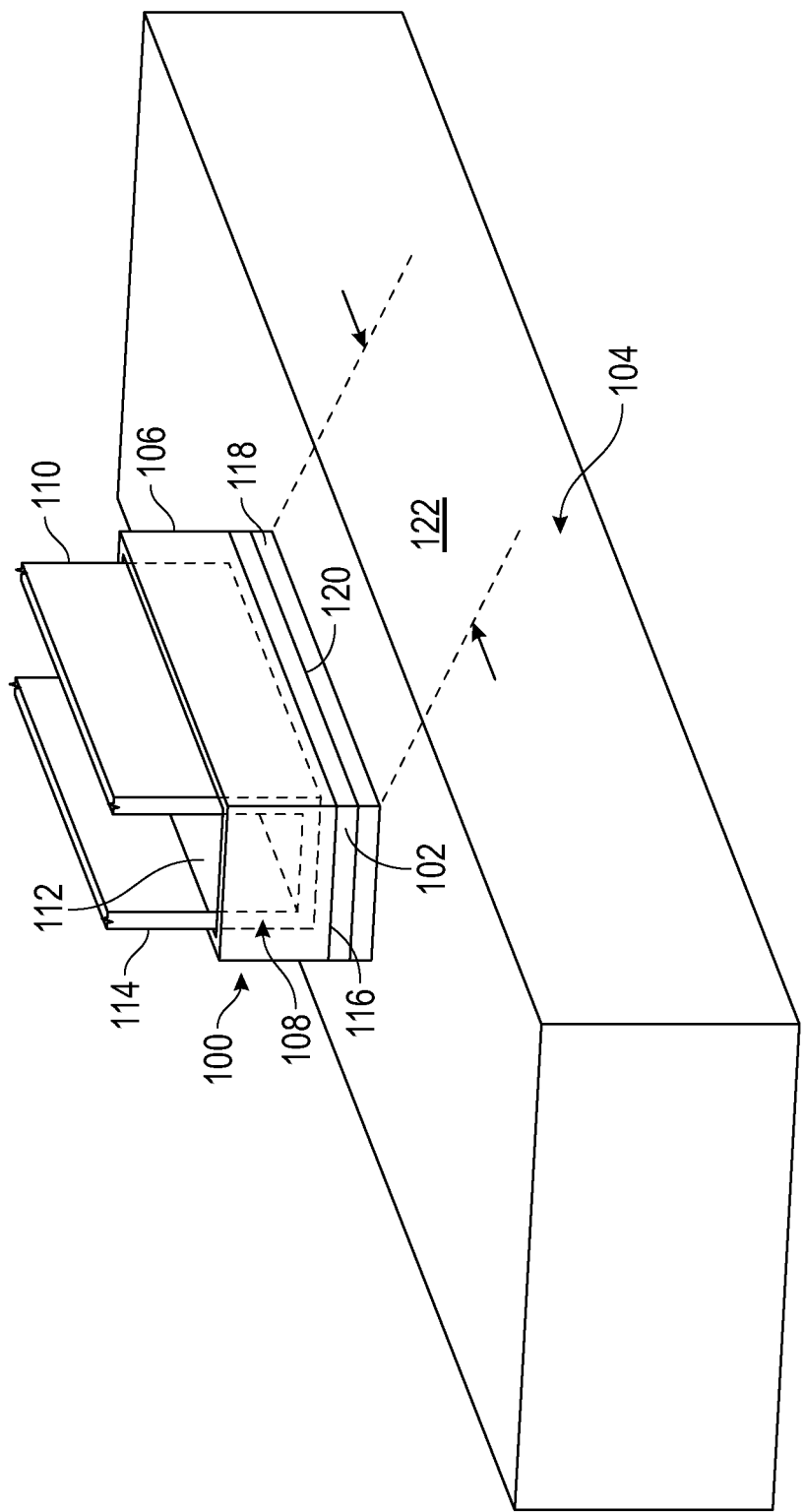
FIG. 1 illustrates an eddy current probe assembly having an eddy current probe that can analyze an article, in accordance with at least one example of the present disclosure.

Now making reference to the Figures, and more specifically FIG. 1, an eddy current probe assembly 100 having an eddy current probe 102 that can analyze an article 104 is shown, in accordance with an embodiment of the present disclosure. The eddy current probe assembly 100 can also include a housing 106 along with a coolant passage 108 disposed within the housing 106. The housing 106 can be formed of any metal alloy, such as 300 series stainless steel, or the like. In addition, the housing 106 can be formed using any type of additive technology, such as that available from Lithoz™ headquartered in Vienna, Austria. In an embodiment where the housing 106 is formed from additive technology, where the housing 106 could be formed from a ceramic material such that instead of having a separate barrier, such as the barrier 118, the ceramic construction of the housing 106 would allow the housing 106 to function as a barrier and have the same functionality as the barrier 108. In this embodiment where the housing 106 is formed using additive technologies, the eddy current probe 102 could be inserted into the bottom of the cooling channel, such as a coolant passage section 210 (FIG. 2A) of the coolant passage 108. As may be seen with reference to FIG. 1, the coolant passage 108 includes a first portion 110 that extends into the housing 106 at a top surface 112 of the housing 106. Moreover, the coolant passage 108 includes a second portion 114 that extends away from the housing top surface 112 where the coolant passage forms a loop within the housing 106. In addition, the coolant passage 108 may extend along a length 122 of the housing 106. As may be seen with reference to FIG. 1, the eddy current probe 102 may be disposed at a bottom surface 116 of the housing 106, where a side 200 (FIG. 2A) of the eddy current probe 102 is disposed adjacent the housing bottom surface 116. In addition, the eddy current probe assembly 100 can include a barrier 118 disposed at a side 120 of the eddy current probe 102.

Figure 3:
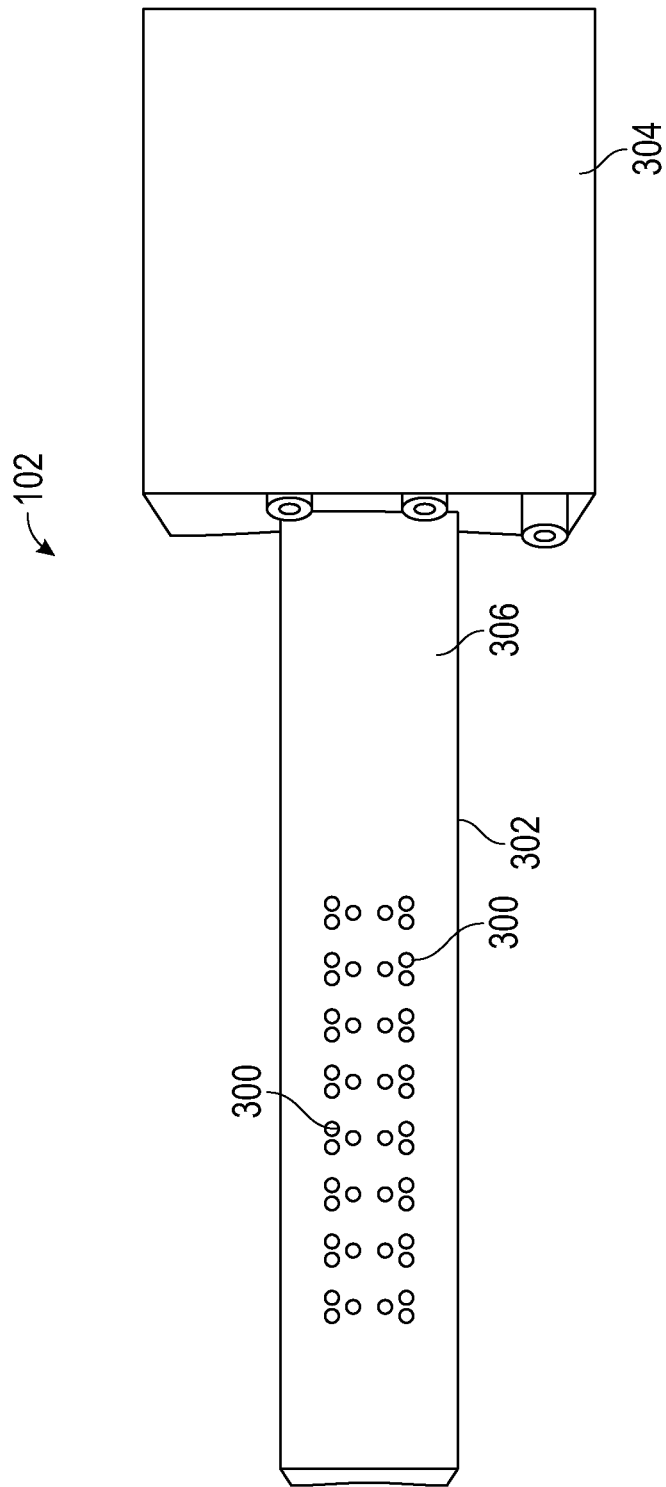
FIG. 3 illustrates the eddy current probe of FIG. 1, in accordance with at least one example of the present disclosure.
Figure 4:
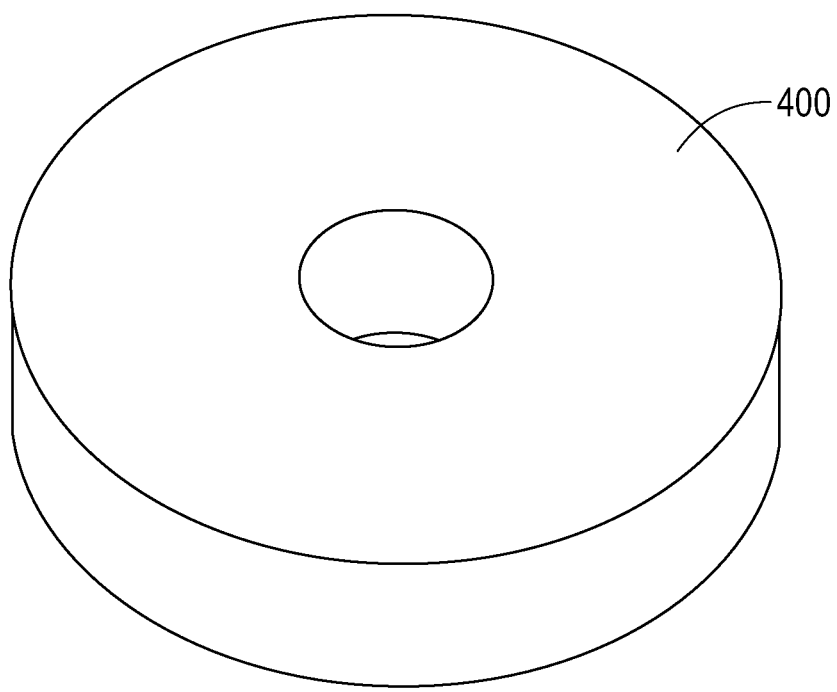
FIG. 4 illustrates a coil that may be used with the eddy current probe of FIG. 1, in accordance with at least one example of the present disclosure.

The eddy current probe 102 can be used to analyze the article 104 for defects, such as fissures, voids, and the like. In particular, as discussed with reference to FIG. 3, the eddy current probe 102 can include ECAs 300 having individual coils 400 (FIG. 4) disposed on a printed circuit board (PCB) 302 along with circuitry 304 that can be used to control the ECAs 300. In particular, the circuitry 304 can include electronics to control the ECAs 300. In the embodiment shown with reference to FIG. 3, the ECAs 300 can have a transmit-receive configuration. The PCB 302 can be flexible such that a section of the PCB 302, such as the flexible PCB section 306, can be manipulated based on the requirements of the eddy current probe assembly 100 and the eddy current probe 102. In an embodiment, the eddy current probe assembly 102 along with the PCB 302 and the flexible PCB section can have a thickness in a range of about between about 0.01 mm to about 0.5 mm. By virtue of the eddy current probe 102 along with the PCB 302 and the PCB section 306 being thin, this increases the efficiency with which cooling may occur. Moreover, the thin configuration of the eddy current probe 102 along with the PCB 302 and the PCB section 306 allows for cooling on the eddy current probe side 200.

In an embodiment, the coil 400 of the eddy current probe 102 can operate in one of a bridge mode, a transmit-receive mode, or in a differential transmit-receive mode. In addition, coils of the eddy current probe 102 can have an array configuration as shown with reference to FIGS. 5A-5C. For example, in FIG. 5A, the coils 400 can be arranged in a line to form an array 500. In addition, the coils can be arranged in two offset lines to form an array 502 as shown with reference to FIG. 5B. In the embodiment of FIG. 5B, the array 502 can be defined by a row 504 of the coils 400 along with a row 506 of the coils 400. As may be seen with reference to FIG. 5B, the row 504 can be offset from the row 506. In particular, in the embodiment shown with reference to FIG. 5B, instead a center 508 of the coils 400 in row 504 being aligned with a center 510 of the coils 400 in the row 506, the centers 508 and 510 are a spaced apart a width "w," as shown with reference to FIG. 5B. Therefore, any areas of inspection missed by the coils 400 in the row 504 will be inspected by the coils 400 in the row 506. Moreover, the eddy current probe 102 can have an array of coils having any number of rows, as shown with reference to FIG. 5C and an array 508. It should be noted that while only two rows and four rows of arrays are shown, an array can have any number of arrays with any number of coils 400 in each of the arrays in accordance with embodiments.

Figure 5A:
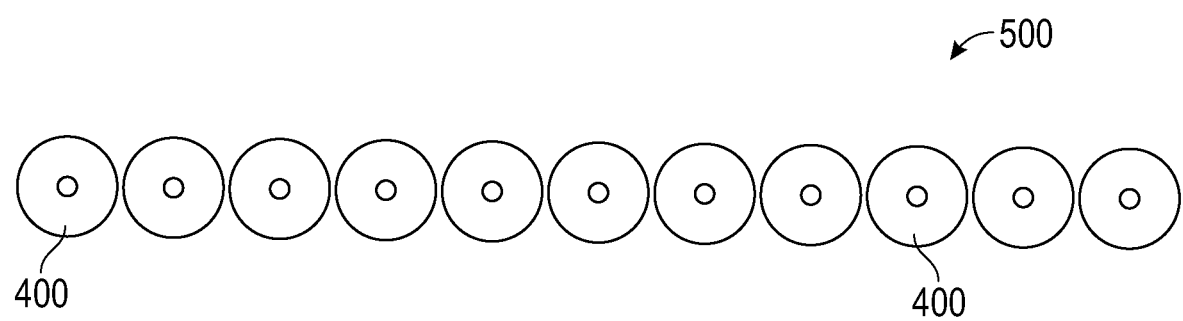
FIGS. 5A-5C illustrate arrays of coils that can be used with the eddy current probe of FIG. 1, in accordance with examples of the present disclosure.
Figure 5B:
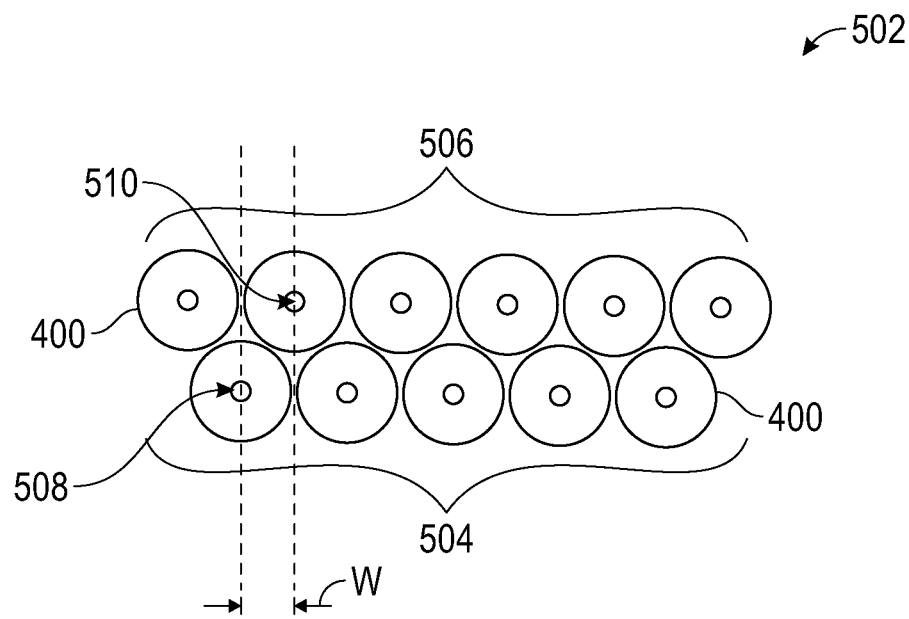
Figure 5C:
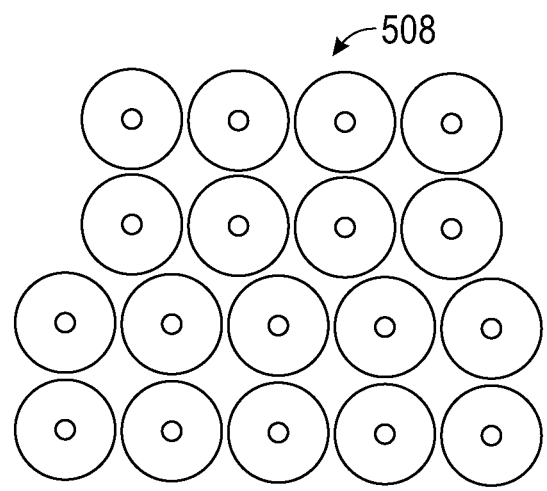
Figure 6:
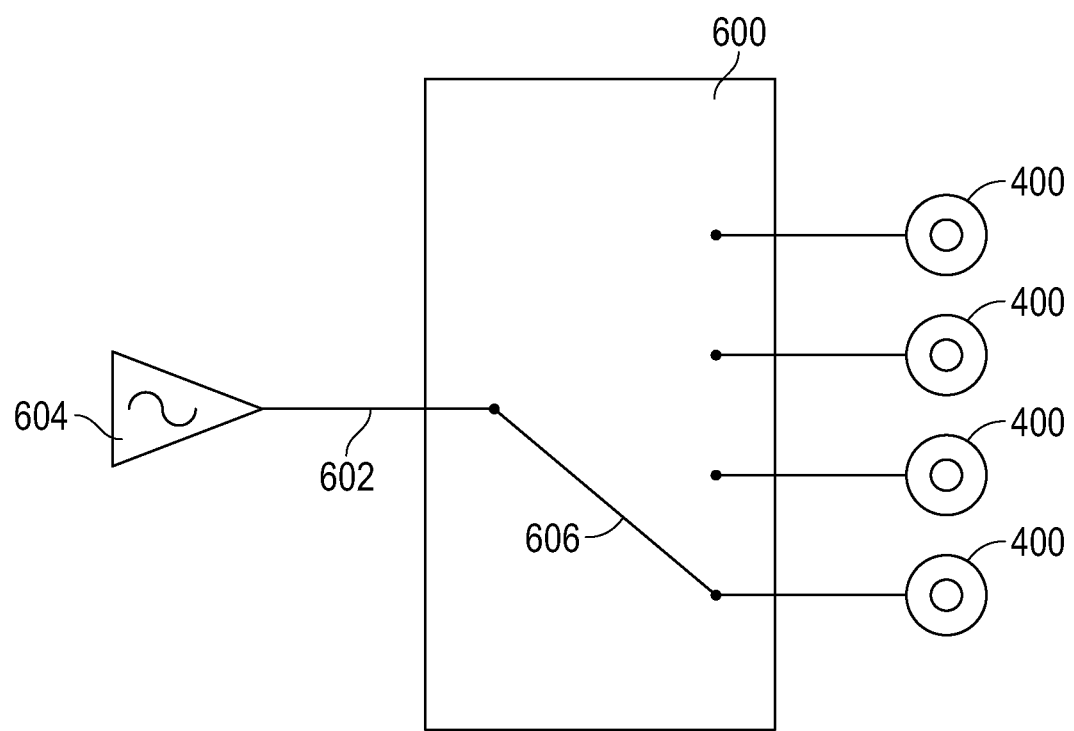
FIG. 6 illustrates a selector that can be used with the arrays of coils of FIGS. 5A-5C, in accordance with at least one example of the present disclosure.

In an embodiment where the eddy current probe 102 includes an array of coils, such as the arrays 500, 502 and 508 shown with reference to FIGS. 5A-5C, the eddy current probe 102, can include a selector 600 that provides a generator signal 602 from a generator 604 to one or more elements in an arrays of coils, such as the array 500, 502, and 508 of the coils 400, as shown with reference to FIG. 6. In an embodiment, the selector 600 can establish a signal path for drive of selected coils 400 during operation of the eddy current probe 102 in response to control signals from the circuitry 304. As shown illustratively, with reference to a switch 606 of the selector 600, the selector 600 can enable the switch 606 to establish a signal path between the generator signal 602 and selected ones of the coils 400. In addition, the selector 600 can include circuitry to monitor the coil 400 that is selected for operation, such as to receive an indication of an eddy current inducted by excitation of selected ones of the coils 400. Further examples of multiplexing can be found in U.S. Pat. No. 8,816,680, which is hereby incorporated in its entirety.

Returning attention to FIG. 1, as noted above, the eddy current probe assembly 100 can analyze the article 104 to detect features, such as flaws that are open to the surface or near the surface, fissures, voids, and the like. Examples of the article 104 can include metal bars, metal tubes, pipes, an airplane fuselage, an airplane wing, components for railway cars, such as railway wheels, and the like. The article 104 can be a ferromagnetic material, such as steel. The ferromagnetism of the article 104 can impact the ability of the eddy current probe 102 to detect defects during ECT. However, when the article 104 is above the Curie point of the material from which the article 104 is formed, a sharp change in the ferromagnetic properties occur such that the ferromagnetism of the article 104 has a lesser impact on ECT. For example, the Curie point for steel can be in excess of 700° C. When the eddy current probe 102 is used to analyze the article 104 above the Curie point of the material used to form the article 104, the eddy current probe assembly 100 can regulate the temperature of the eddy current probe 102 in order to prevent overheating of the eddy current probe 102 during analysis of the article 104. In particular, the coolant passage 108 can provide coolant 202 to the eddy current probe assembly 100, as shown with reference to FIG. 2A.

In an embodiment, the coolant 202 can be supplied to the eddy current probe assembly 100 and the housing 106 at an inlet port 204 of the housing 106. In addition, the coolant 202 can exit the housing 106 via an outlet port 206 of the housing 106. The coolant passage 108 can include coolant passage sections 208 and 209 disposed at a side of the housing 106, as shown with regards to FIG. 2A. In some embodiments, the coolant passage 108 can include a jacket structure 214 as shown with regards to FIG. 2B that extends from the inlet port 204 and the outlet port 206 as shown with reference to FIG. 2C.

Furthermore, in an embodiment, the coolant passage 108 can function to regulate the temperature of the flexible OCB section 306 of the eddy current probe 102. More specifically, the coolant passage section 208 can thermally couple with the flexible OCB section 306 of the eddy current probe 102, as shown with reference to FIG. 2A. Here, the coolant 202 passing through the coolant passage section 208 may absorb heat from the flexible OCB section 306 during operation of the eddy current probe assembly 100, thereby regulating the temperature of the flexible OCB section 306 during analysis of the article 104.

Figure 2A:
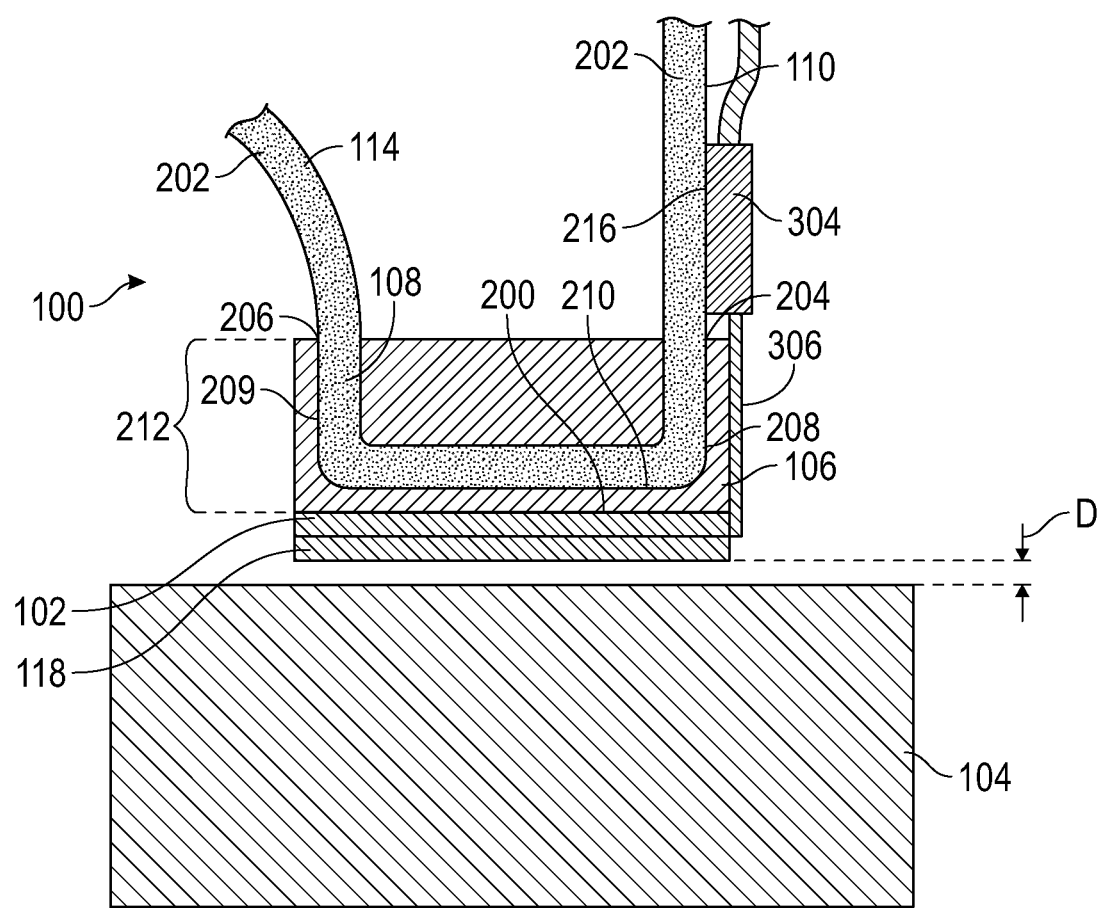
FIGS. 2A-2C illustrate the configuration of a coolant passage within a housing of the eddy current probe assembly of FIG. 1, in accordance with at least one example of the present disclosure.

As can be seen with reference to FIG. 2A, the coolant passage sections 208 and 209 along with the coolant passage section 210 of the coolant passage 108 can combine to form a coolant passage loop 212 between the inlet port 204 and the outlet port 206 where heat transfer can occur between the coolant 202 and the eddy current probe 102. The coolant passage sections 208 and 209 can extend along a length of the housing 106 or nearby a surface of the housing 106 that is different from a length and/or a surface along which the coolant passage section 210 extends along the housing 106. Moreover, as may be seen with reference to FIG. 2A, the eddy current probe assembly 100 can be spaced a distance "D" from the article 104. In an embodiment, the distance "D" may be in a range of about 0.5 mm to about 3.0 mm and may be about 1.0 mm.

As noted, the configuration of the cooling loop can facilitate heat transfer between the coolant 202 and eddy current probe 102. In particular, the eddy current probe 102 is adjacent the coolant passage section 210. The material of the article 104 may be above its Curie point such that the eddy current probe 102 can be heated up during analysis. By virtue of the eddy current probe 102 being adjacent the coolant passage section 210, the eddy current probe 102 can be thermally coupled with the coolant passage section 210 and the coolant passage 108 such that heat transfer via conduction can occur between the coolant 202 passing through the coolant passage section 210 and the eddy current probe 102. The coolant may be any fluid, in air of liquid form, that is capable of absorbing heat. Examples of fluid that can be used for the coolant 202 can include water, oil, glycol, ethylene glycol, or propylene glycol. In addition, examples of fluid that can be used for the coolant can include combinations of water, oil, or glycol.

In an embodiment, the coolant passage 108 can regulate a temperature of the circuitry 304. In some embodiments, the circuitry 304 can be in close proximity to the article 104. During analysis of the article 104 with the eddy current probe assembly 100, heat can radiate from the article 104, which can have an adverse impact on the circuitry 304. In an embodiment, the circuitry 304 can be thermally coupled to a section 216 of the coolant passage 108. By virtue of the circuitry 304 being thermally coupled to the coolant passage loop 212, heat transfer via conduction can occur between the coolant 202 passing through the coolant passage loop 212 and the circuitry 304.

Returning attention to FIG. 1, when the eddy current probe assembly 100 is being used to analyze the article 104, the eddy current probe 102 is moved over the article 104 numerous times in order to detect potential flaws in the article 104. It should be noted that in an alternative embodiment, the eddy current probe assembly 100 can be fixed in a production line for bars, tubes, or any other type of article. In the alternative embodiment, the article will pass on the production line under the eddy current probe assembly 100 such that as the article passes under the eddy current probe assembly 100, the eddy current probe assembly 100 can inspect the article. In order to prevent damage from occurring to the eddy current probe 102 during analysis of the article 104, the eddy current probe assembly 100 can include the barrier 118. In an embodiment, the barrier 118 can be a thermal barrier that can partially thermally insulate the eddy current probe 102 from the article 104. In addition, the barrier can function to protect the eddy current probe 102 from premature wear that may occur by being moved along a surface of the article 104 during analysis. In an embodiment, the barrier 118 may be formed from a ceramic material that increases temperature and wear resistance of the eddy current probe 102. Examples of materials that may be used for the barrier 118 can include titanium oxide, silicon oxide, chrome oxide, aluminum oxide, and zirconium oxide. The barrier 118 can also be formed from a thin layer of austenitic stainless steel, such as any Type of 300 series steel, or any materials the provides high heat and mechanical resistance, low heat conductivity, and low electrical conductivity, in accordance with embodiments. Moreover, in accordance with embodiments, the barrier 118 can be formed using a thin film deposition process, such as physical vapor deposition, electron beam evaporation, pulsed laser deposition, or any type of sputtering technique.

Figure 2B:
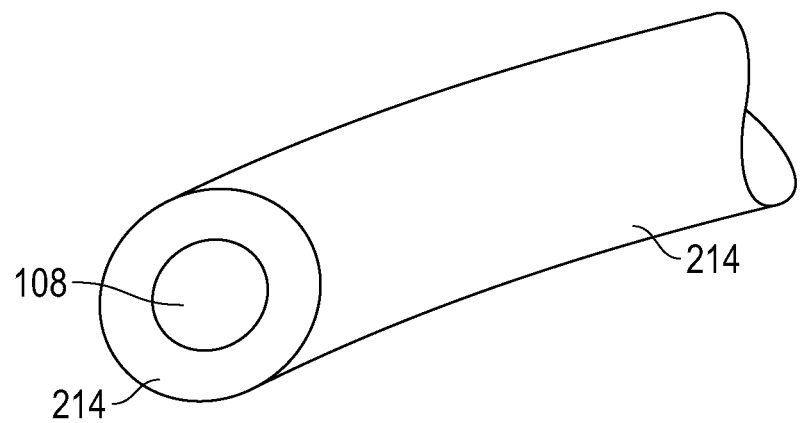
Figure 2C:
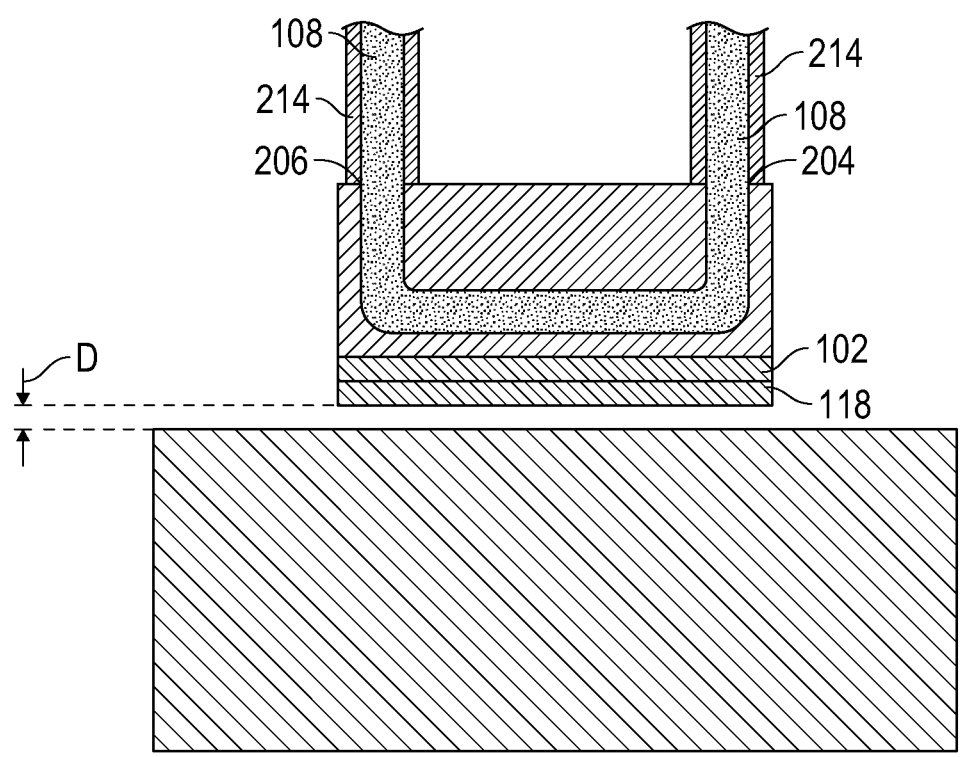
Figure 7:
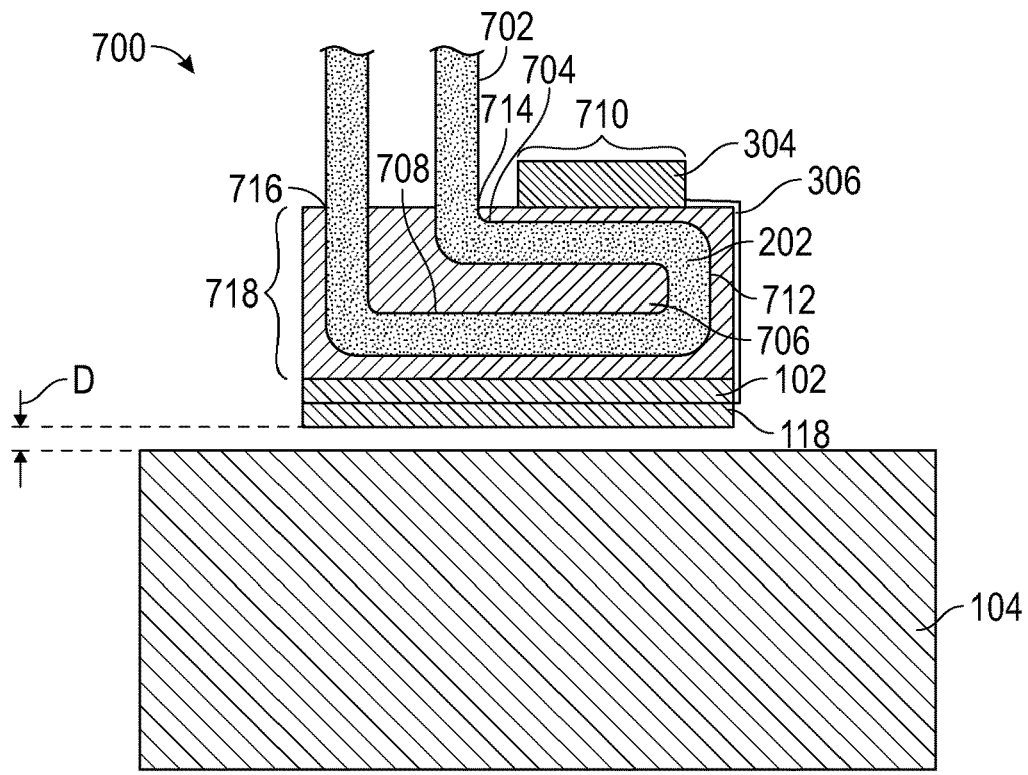
FIG. 7 illustrates an eddy current probe assembly having an eddy current probe that can analyze an article, in accordance with at least one example of the present disclosure.

In addition to the embodiment shown with reference to FIGS. 2A-2C, coolant passages can have the configuration shown with reference to FIG. 7, where an eddy current probe assembly 700 is shown in accordance with an alternative embodiment of the present disclosure. The eddy current probe assembly 700 can include the eddy current probe 102 for analyzing the article 104. The eddy current probe assembly 700 can also include a coolant passage 702 through which the coolant 202 can flow. In an embodiment, the coolant passage 702 can include an upper section 704 disposed at an upper portion of a housing 706 of the eddy current probe assembly 700, as shown with reference to FIG. 7. Moreover, the coolant passage 702 can include a lower section 708 disposed at a lower portion of the housing 706, also as shown with reference to FIG. 7. In an embodiment, the coolant passage upper section 704 can be thermally coupled with the circuitry 304 such that the coolant 202 passing through the coolant passage 702 and the coolant passage upper section 704 can draw heat from the circuitry 304 during analysis of the article 104 with the eddy current probe assembly 700. Similar to the coolant passage 108, the coolant passage 702 can extend along a length 122 of the housing 106. In an embodiment, the housing 706 can include a heat spreading section 710 through which thermal coupling and heat transfer can occur between the circuitry 304 and the coolant passage upper section 704. In an embodiment, the housing heat spreading section 710 can be a heat spreader. Moreover, the housing 706 can be formed of any metal alloy, such as 300 series stainless Steel because of the high temperature characteristics, low heat transfer characteristics, low conductivity characteristics, and low ferromagnetic characteristics of 300 series steel.

In an embodiment, the coolant passage 702 can function to regulate the temperature of the flexible OCB section 306 of the eddy current probe 102. More specifically, the coolant passage 702 can include a section 712 that thermally couples with the flexible OCB section 306 of the eddy current probe 102, as shown with reference to FIG. 7. Here, the coolant 202 passing through the coolant passage section 712 can absorb heat from the flexible OCB section 306 during operation of the eddy current probe assembly 700, thereby regulating the temperature of the flexible OCB section 306 during analysis of the article 104. In order to allow the passage of the coolant 202 into the coolant passage 702, the housing 706 can include an inlet port 714 at a top portion of the housing 706. When the coolant 202 travels through the coolant passage 702 and absorbs heat from eddy current probe 102, the circuitry 304, and the flexible OCB section 306, the coolant 202 can exit the housing 706 via an outlet port 716. In the embodiment shown with reference to FIG. 7, the coolant passage 702, along with the coolant passage upper section 704, the coolant passage lower section 708, and the coolant passage section 712 can combine to form a cooling loop 718 within the housing 706 between the inlet port 714 and the outlet port 716.

In the embodiments described above, the circuitry 304 was described as being local to the housing 106/706. In accordance with alternative embodiments of the disclosure, the circuitry 304 can be separate from the housing 106/706 while simultaneously being cooled with a coolant passage that regulates the temperature of the eddy current probe 102, as shown with reference to FIGS. 8-10. Now making reference to FIGS. 8 and 9, an eddy current probe assembly 800 having the eddy current probe 102 for analyzing the article 104 is shown in accordance with an embodiment of the present disclosure. In an embodiment, the coolant passage 108 can include a coolant line set 802 disposed therein, as shown with reference to FIGS. 8 and 9. The coolant line set 802 can include coolant passages 900-904, as shown with reference to FIG. 9. In an embodiment, the coolant 202 can pass through the coolant passages 900-904 in order to regulate the temperature of the eddy current probe 102 during analysis of the article 104. Moreover, as may be seen with reference to FIG. 9, the circuitry 304 can be disposed adjacent the coolant passages 900-904. For example, the circuitry 304 can be thermally coupled with each of the coolant passages 900-904 where the coolant 202 passing through each of the coolant passages 900-904 can absorb heat from the circuitry 304 thereby regulating the temperature of the circuitry 304. However, it should be noted that the circuitry 304 can be thermally coupled with any combination of the coolant passages 900-904, such that the circuitry 304 can only be thermally coupled with one or two of the coolant passages 900-904. In an embodiment, as may be seen with reference to FIG. 10, the circuitry 304 can be separate from the housing 106 such as being remote from the housing 106.

Figure 9:
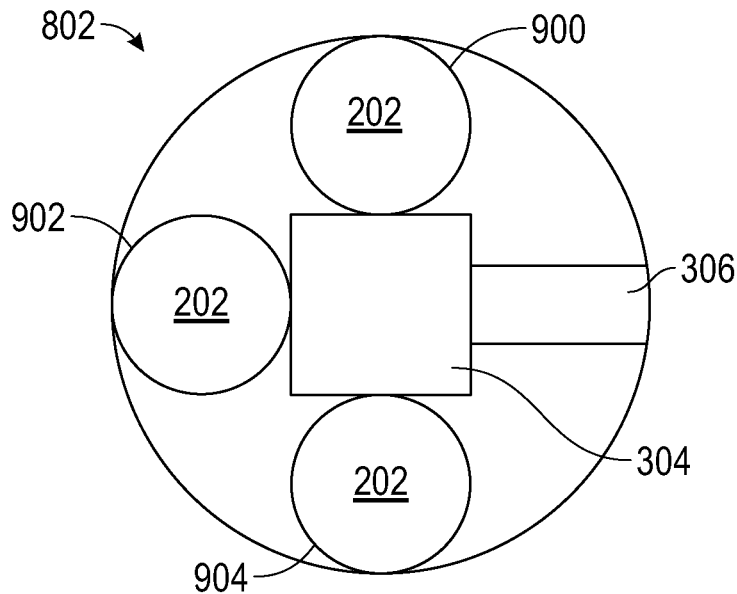
FIG. 9 illustrates a coolant line set of the eddy current probe of FIG. 8, in accordance with at least one example of the present disclosure.
Figure 10:
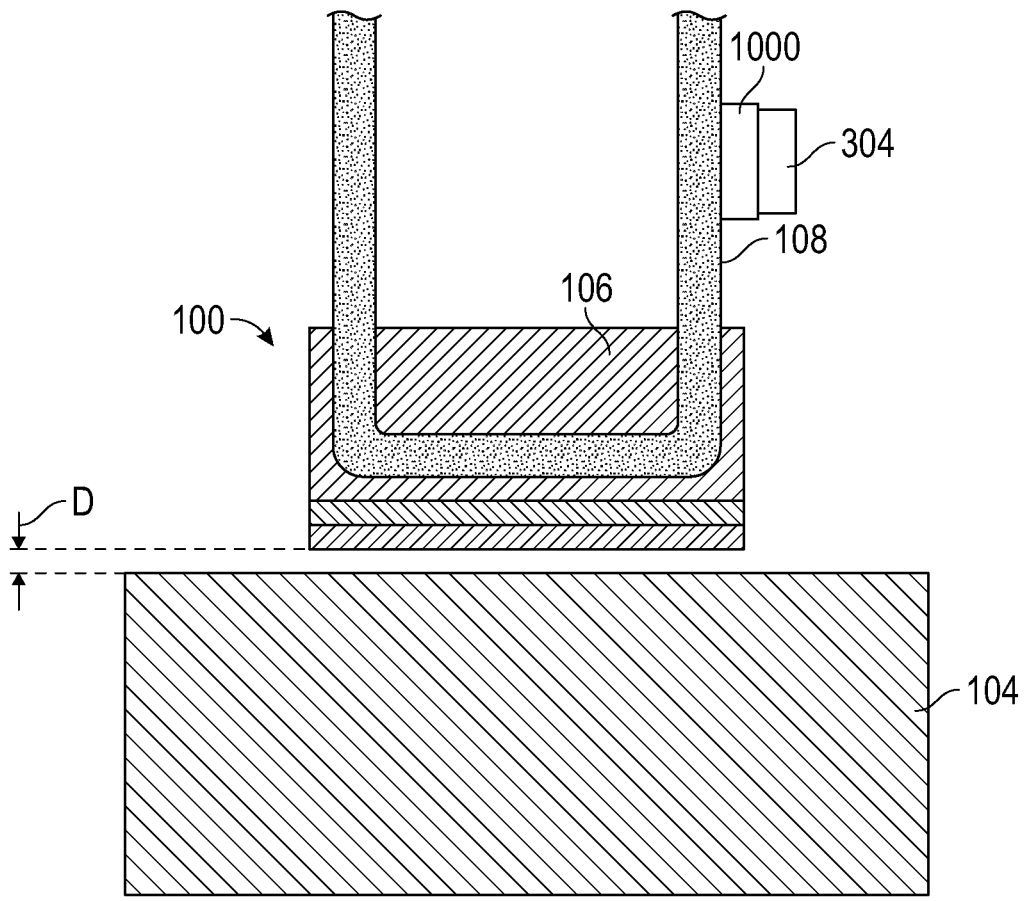
FIG. 10 illustrates an eddy current probe assembly having an eddy current probe that can analyze an article, in accordance with at least one example of the present disclosure.

It should be noted that while the configuration described with reference to FIG. 9 is shown in conjunction with the housing 106 and the coolant passage loop 212 along with the components thereof described with reference to FIGS. 1 and 2, the configuration described with reference to FIG. 9 can also be used in conjunction with the housing 706 and the cooling loop 718 along with the components thereof described with reference to FIG. 7 in accordance with an embodiment of the present disclosure. For example, the coolant line set 802 along with the coolant passages 900-904 can enter the housing 706 at the inlet port 714 and exit the housing 706 at the 716 where the cooling loop 718 can include the coolant passages 900-904 in addition to the components previously discussed.

As shown with reference to FIG. 9, the flexible OCB section 306 can couple with the circuitry 304 within the coolant line set 802 and then extend out of the coolant line set 802. Furthermore, as shown with reference to FIG. 8, the flexible OCB section 306 can extend along an outer surface 804 of the coolant line set 802 between the circuitry 304 and the eddy current probe 102. Moreover, the flexible OCB section 306 can thermally couple with the coolant line set 802 such that the coolant 202 within the coolant line set 802 can regulate the temperature of the flexible OCB section 306 during analysis of the article 104.

Figure 8:
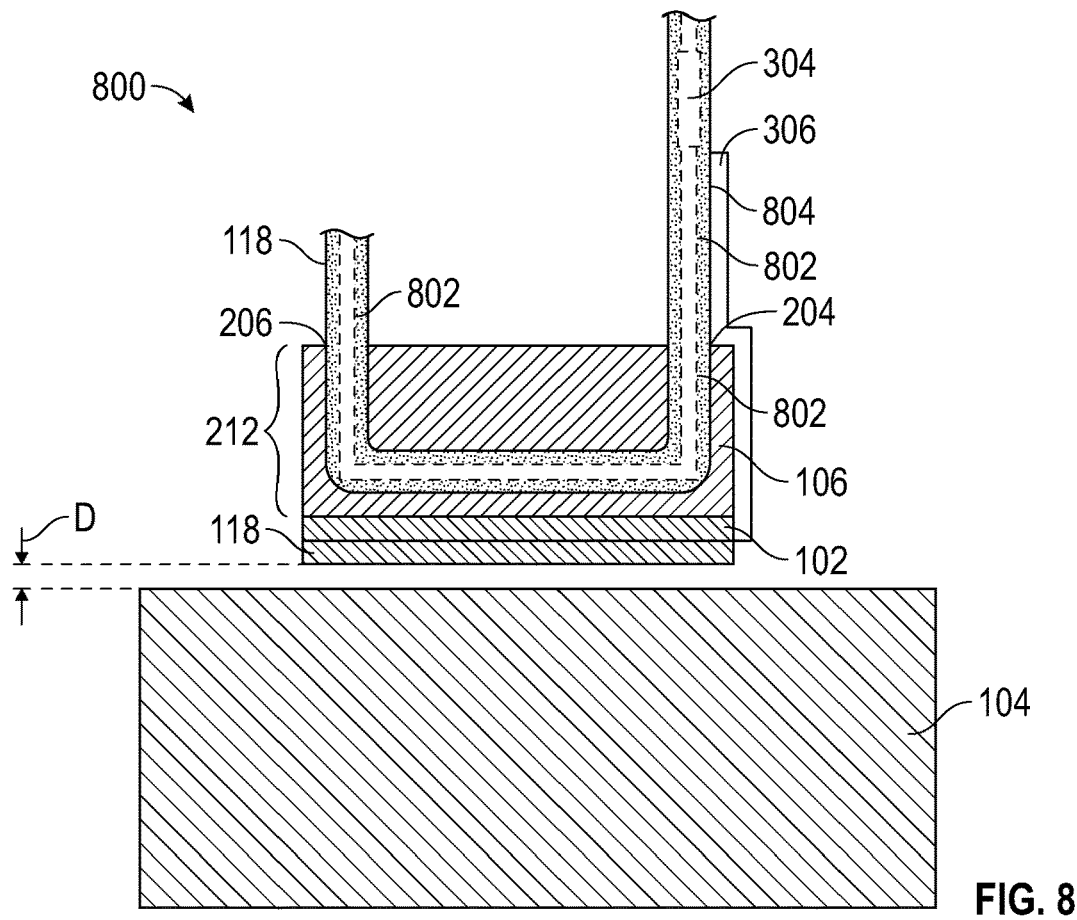
FIG. 8 illustrates an eddy current probe assembly having an eddy current probe that can analyze an article, in accordance with at least one example of the present disclosure.

In addition to the configuration shown with reference to FIGS. 8 and 9, the circuitry 304 can be remotely located from the eddy current probe assembly 100 while at the same time being thermally coupled with the coolant passage 108. In this embodiment, a thermal coupler 1000 can thermally couple the circuitry 304 with the coolant passage 108. Moreover, the thermal coupler can be mechanically separate from the eddy current probe assembly 100. In an embodiment, the thermal coupler 1000 can be a heat spreader.

Figure 11:
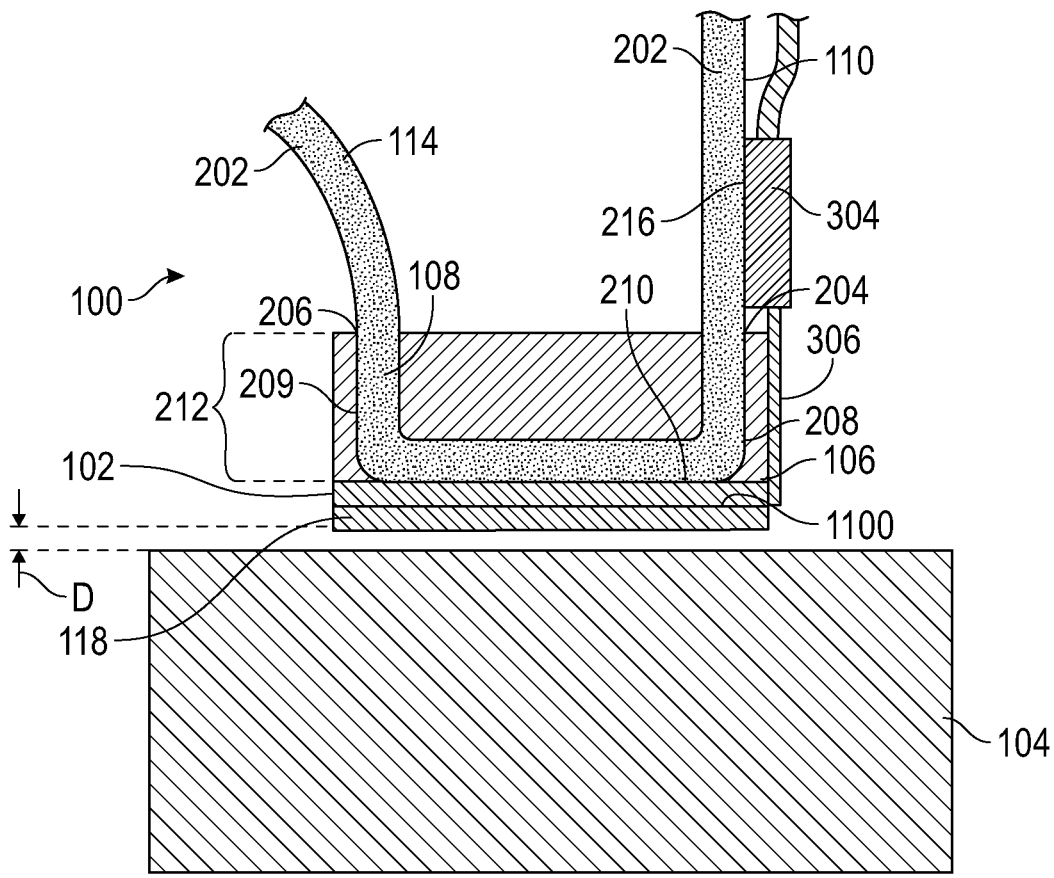
FIG. 11 shows a configuration of a coolant passage within a housing of the eddy current probe assembly, in accordance with at least one example of the present disclosure.
Figure 12:
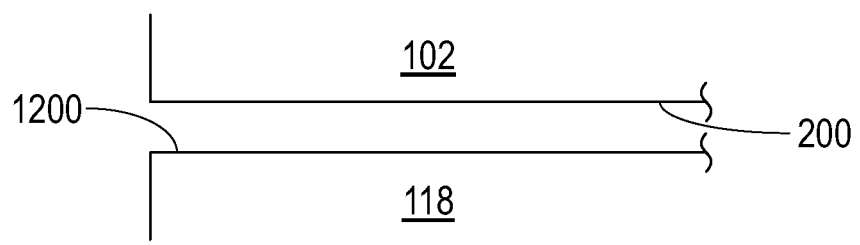
FIG. 12 illustrates a surface of an eddy current probe of the eddy current probe assembly of FIG. 11 and a surface of a barrier the eddy current probe assembly of FIG. 11, in accordance with at least one example of the present disclosure.

In addition to the embodiments discussed above, the eddy current probe assembly 100 can have the configuration shown with reference to FIG. 11. In this embodiment, the coolant passage 108 can be in direct contact with the eddy current probe 102. Here, the coolant passage 210 is in direct contact with the eddy current probe side 200. In this embodiment, the eddy current probe 102 can have thickness in a range of about 0.07 mm to about 0.5 mm as discussed above. In this embodiment, since the coolant passage 108 is in direct contact with the eddy probe 102 having a thin profile, a temperature gradient can be formed between an outer surface 1200 (FIG. 12) of the barrier 118 and the coolant passage 108 where the barrier outer surface 1200 can have a temperature of about 700° C. while the eddy current probe 102 has a temperature of about 100° C. since the eddy current probe 102 can be in direct contact with the coolant passage 108. As may be seen with reference to FIG. 11, the eddy current probe side 200 contacts the barrier outer surface 1200 at 1100.

The above detailed description includes references to the accompanying drawings, which form a part of the detailed description. The drawings show, by way of illustration, specific examples in which the invention can be practiced. These examples are also referred to herein as examples. Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms a or an are used, as is common in patent documents, to include one or more than one, independent of any other instances or usages of at least one or one or more. In this document, the term or is used to refer to a nonexclusive or, such that A or B includes A but not B, B but not A, and A and B, unless otherwise indicated. In this document, the terms including and in which are used as the plain-English equivalents of the respective terms comprising and wherein. Also, in the following claims, the terms including and comprising are open-ended, that is, a system, device, article, composition, formulation, or process that includes elements in addition to those listed after such a term in a claim are still deemed to fall within the scope of that claim. Moreover, in the following claims, the terms first, second, and third, etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. An eddy current probe assembly for analyzing an article, the eddy current probe assembly comprising:
    a housing comprising a coolant passage extending into the housing, the coolant passage forming a loop within the housing including ports out of the housing, the coolant passage allowing coolant flow through the housing;
    at least one eddy current probe disposed on or within a housing surface, the at least one eddy current probe being supported by a printed circuit board, the at least one eddy current probe being thermally coupled with a first portion of the coolant passage using at least a first surface of the at least one eddy current probe, wherein a portion of the housing separates the at least one eddy current probe from the first portion of the coolant passage; and
    a barrier layer disposed on a second surface of the at least one eddy current probe opposite the at least one eddy current probe first surface where the at least one eddy current probe separates the barrier layer from the portion of the housing.

2. The eddy current probe assembly of claim 1, further comprising circuitry configured to control the at least one eddy current probe, the circuitry being thermally coupled with a second portion of the coolant passage.

3. The eddy current probe assembly of claim 1, the eddy current probe assembly further comprising circuitry configured to control the at least one eddy current probe where a portion of the coolant passage extends towards the housing and comprises a coolant line set, the circuitry thermally coupled with at least a portion of the coolant line set, wherein the circuitry is thermally coupled with at least a portion of the coolant line set via a heat spreader.

4. The eddy current probe assembly of claim 3, wherein the heat spreader is mechanically separate from the housing.

5. The eddy current probe assembly of claim 3, wherein the heat spreader is included as a portion of the housing.

6. The eddy current probe assembly of claim 1, wherein a second portion of the coolant passage extends along a length of the housing at or nearby a surface of the housing different from the first portion.

7. The eddy current probe assembly of claim 1, wherein the housing comprises stainless steel.

8. The eddy current probe assembly of claim 1, wherein the barrier layer comprises a ceramic material.

9. The eddy current probe assembly of claim 1, further comprising a coolant including at least one of water, oil, or glycol, or combinations thereof.

10. The eddy current probe assembly of claim 1, wherein the coolant passage comprises a jacket structure including a portion extending from the housing.

11. The eddy current probe assembly of claim 1, wherein the barrier layer is a thermal barrier layer.

12. The eddy current probe assembly of claim 1, wherein the at least one eddy current probe has a thickness in a range of between about 0.1 mm to about 0.5 mm and the thickness allows for cooling on one side of the at least one eddy current probe.

13. An eddy current probe assembly for analyzing an article, the eddy current probe assembly comprising:

a housing comprising a coolant passage extending into the housing, the coolant passage forming a loop within the housing including ports out of the housing, the coolant passage allowing coolant flow through the housing;

at least one eddy current probe disposed on or within a housing surface, the at least one eddy current probe being supported by a printed circuit board, the at least one eddy current probe being thermally coupled with a first portion of the coolant passage using at least a first surface of the at least one eddy current probe, wherein a portion of the housing separates the at least one eddy current probe from the first portion of the coolant passage;

a barrier layer disposed on a second surface of the at least one eddy current probe opposite the at least one eddy current probe first surface where the at least one eddy current probe separates the barrier layer from the portion of the housing; and circuitry configured to control the at least one eddy current probe where a portion of the coolant passage extends towards the housing and comprises a coolant line set, the circuitry being disposed with the coolant line set and being thermally coupled with at least a portion of the coolant line set.

14. The eddy current probe assembly of claim 13, wherein a second portion of the coolant passage extends along a length of the housing at or nearby a surface of the housing different from the first portion and the housing comprises stainless steel.

15. The eddy current probe assembly of claim 13, wherein the barrier layer comprises a ceramic material and is a thermal barrier layer.

16. The eddy current probe assembly of claim 13, further comprising a coolant including at least one of water, oil, or glycol, or combinations thereof.

17. The eddy current probe assembly of claim 13, wherein the coolant passage comprises a jacket structure including a portion extending from the housing.

18. The eddy current probe assembly of claim 13, wherein the at least one eddy current probe has a thickness in a range of between about 0.1 mm to about 0.5 mm and the thickness allows for cooling on one side of the at least one eddy current probe.

19. An eddy current probe assembly for analyzing an article, the eddy current probe assembly comprising:

a housing comprising a coolant passage extending into the housing, the coolant passage forming a loop within the housing including ports out of the housing, the coolant passage allowing coolant flow through the housing;

at least one eddy current probe disposed on or within a housing surface, the at least one eddy current probe being supported by a printed circuit board, the at least one eddy current probe being thermally coupled with a first portion of the coolant passage using at least a first surface of the at least one eddy current probe, wherein a portion of the housing separates the at least one eddy current probe from the first portion of the coolant passage;

a barrier layer disposed on a second surface of the at least one eddy current probe opposite the at least one eddy current probe first surface where the at least one eddy current probe separates the barrier layer from the portion of the housing; and circuitry configured to control the at least one eddy current probe, the circuitry being thermally coupled with a second portion of the coolant passage via a thermal coupler.

20. The eddy current probe assembly of claim 19, wherein the at least one eddy current probe has a thickness in a range of between about 0.1 mm to about 0.5 mm and the thickness allows for cooling on one side of the at least one eddy current probe.

* * * * *